(12) United States Patent
Visalli et al.

(10) Patent No.: US 8,126,084 B2
(45) Date of Patent: Feb. 28, 2012

(54) PROCESSING METHOD FOR PROVIDING, STARTING FROM SIGNALS ACQUIRED BY A SET OF SENSORS, AN AGGREGATE SIGNAL AND DATA ACQUISITION SYSTEM USING SUCH METHOD

(75) Inventors: Giuseppe Visalli, Messina (IT); Francesco Pappalardo, Paterno (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 12/844,451

(22) Filed: Jul. 27, 2010

(65) Prior Publication Data

US 2010/0290567 A1 Nov. 18, 2010

Related U.S. Application Data

(62) Division of application No. 11/787,194, filed on Apr. 12, 2007, now Pat. No. 7,817,763.

(30) Foreign Application Priority Data

Apr. 12, 2006 (EP) .................................... 06425259

(51) Int. Cl.
*H04L 27/00* (2006.01)
*H03K 9/00* (2006.01)
(52) U.S. Cl. ......... 375/316; 375/324; 375/340; 714/752
(58) Field of Classification Search .................. 375/369, 375/295, 340, 347; 340/539.22; 714/752
See application file for complete search history.

(56) References Cited

U.S. PATENT DOCUMENTS

| 6,381,726 B1 * | 4/2002 | Weng .............................. 714/780 |
| 7,392,454 B2 * | 6/2008 | Piret et al. ...................... 714/752 |
| 7,404,134 B2 * | 7/2008 | Le Bars et al. ................. 714/752 |
| 2004/0026510 A1 | 2/2004 | Cheung et al. |

OTHER PUBLICATIONS

A. Wang, W. Einzelam and A.P. Chandrakasan, "Energy Scalable Protocols for Battery-Operated MicroSensor Network", Kluwer Journal of VLSI Signal Processing, pp. 223-239, Nov. 2001.

(Continued)

*Primary Examiner* — Ted M Wang
(74) *Attorney, Agent, or Firm* — Lisa K. Jorgenson; Kevin D. Jablonski; Graybeal Jackson LLP

(57) ABSTRACT

Embodiment for forming an aggregate signal from a plurality of starting signals, comprising:
  acquiring said starting signals through respective sensors of a homogeneous sensors group;
  converting acquired signals in respective digital signals having data represented with a predetermined bits number;
  processing the digital signals to form aggregate signal.
The processing step comprises the operations of:
  modifying digital signals changing the data format of each such digital signals from a first format to a second format, each data in the second format having been obtained from a respective data in the first format through an operation of permuting the bits position according to a permutation scheme associated with said data and to the specific digital signal comprising that data;
  forming aggregate signal obtaining said aggregate signal data by means of a bitwise logic operator acting upon said modified digital signal respective data.

10 Claims, 8 Drawing Sheets

OTHER PUBLICATIONS

Sinha A et al., "Algorithmic Transforms for Efficient Energy Scalable Computation", Low Power Electronics and Design, 2000, ISLPED '00, Proceedings of the 2000 International Symposium on Jul. 26-27, 2000, Piscataway, NJ, USA, IEEE, Jul. 26, 2000, pp. 31-36, XP010517300.

Heinzelman W.R. et al., "Energy-Scalable Algorithms and Protocols for Wireless Microsensor Networks", Acoustics, Speech, and Signal Processing, 2000, ICASSP '00, Proceedings, 2000 IEEE International Conference on Jun. 5-9, 2000, Piscataway, N, USA, IEEE, vol. 6, Jun. 5, 2000, pp. 3722-3725, XP010505707.

European Search Report for European Patent Application No. 06 42 5257, dated Sep. 1, 2006.

* cited by examiner

PROCESSING METHOD FOR PROVIDING, STARTING FROM SIGNALS ACQUIRED BY A SET OF SENSORS, AN AGGREGATE SIGNAL AND DATA ACQUISITION SYSTEM USING SUCH METHOD

PRIORITY CLAIM

The present application is a Divisional of U.S. patent application Ser. No. 11/787,194, filed Apr. 12, 2007, currently pending, which is claims priority from European patent application No. 06425259.6, filed Apr. 12, 2006, all of the foregoing applications are incorporated by reference herein in their entireties.

TECHNICAL FIELD

An embodiment of the present disclosure relates to data acquisition, processing, and transmission, and in particular is concerned with a processing method for providing an aggregate signal, starting from signals acquired from a set of sensors. An embodiment of the present disclosure further relates to a data-acquisition system using such method.

BACKGROUND

As it is known, in an ever increasing number of applications is the widespread use of sensors networks for acquiring various kind of data and for transmitting such data to a remote processing unit. Just to mention a few examples, the use of sensor networks has proven itself particularly advantageous in the security-systems field, in bio-medical applications, in the environment-control field, and in the transport field. In many applications, the sensor networks used are wireless networks, often referred to by the WSN acronym (Wireless Sensors Network).

It is known that in sensor networks, primarily in wireless networks, reducing the area or volume occupied by circuits or components included in the sensors is often a system requirement. For instance, presently in sensor wireless networks are generally used micro-sensors, or MEMS (an acronym of the expression Micro Electro-Mechanical Sensors), realized by CMOS technology, and in the future one envisages a use of sensors realized by sub-micrometric sophisticated technology CMOS (DSM CMOS).

In sensor networks, primarily in wireless networks, another system restraint is a low-energy consumption of the various system components supplied by a battery, with the purpose to maximize the battery life.

In sensor networks, and particularly in wireless networks, to limit the energy required to transmit the sensor output via signals to the remote processing unit, a transmission technique is known, that envisages grouping the sensors provided for acquiring data concerning homogeneous quantities, in such a way as to form groups of sensors. Each of such groups is associated with a local processing unit (that, generally, may be integrated in a sensor of the group), provided for receiving signals output by the sensors, processing such signals to form an aggregate signal, and transmitting such aggregate signal to the remote processing unit. The local processing unit generally comprises a micro-controller with very low power dissipation (MCU, Ultra-low-power Micro Controller) adapted to execute the above described operations.

A specific example of the above indicated transmission technique is disclosed in a paper by A. Wang, W. Einzelam and A. P. Chandrakasan entitled "Energy Scalable Protocols for Battery-Operated MicroSensor network" Kluwer Journal of VLSI Signal Processing, pp. 223-239, November 2001, which is incorporated by reference.

In the above-described transmission technique, the aggregate signal is obtained from the local processing unit by a merge (also referred to in the field by the word "beamforming") of signals output by various sensors of the group, exploiting the redundancy present in such signals. In the above cited paper, such merge is obtained by adaptive equalization. In other techniques, the merge is obtained by a Kalman filtering.

The above-described beamforming techniques require the local processing unit to perform computations of significant complexity, such as for instance arithmetic operations in fixed or floating point. This implies a sizeable power consumption in the local processing unit, which, in practice, is forced to operate as a digital signal processor (DSP).

SUMMARY

An embodiment of the present disclosure makes available a signal processing method, or a beamforming method, for provide an aggregate signal from a plurality of starting signals and that overcomes one or more of the above-described shortcomings.

BRIEF DESCRIPTION OF THE DRAWINGS

Features and advantages of one or more embodiments of the present disclosure will be better understood from the following detailed description, given by way of example, and, therefore, in no way limiting in relation to the appended figures.

In the figures, same or similar elements are indicated with the same reference numerals.

DETAILED DESCRIPTION

Figure 1:
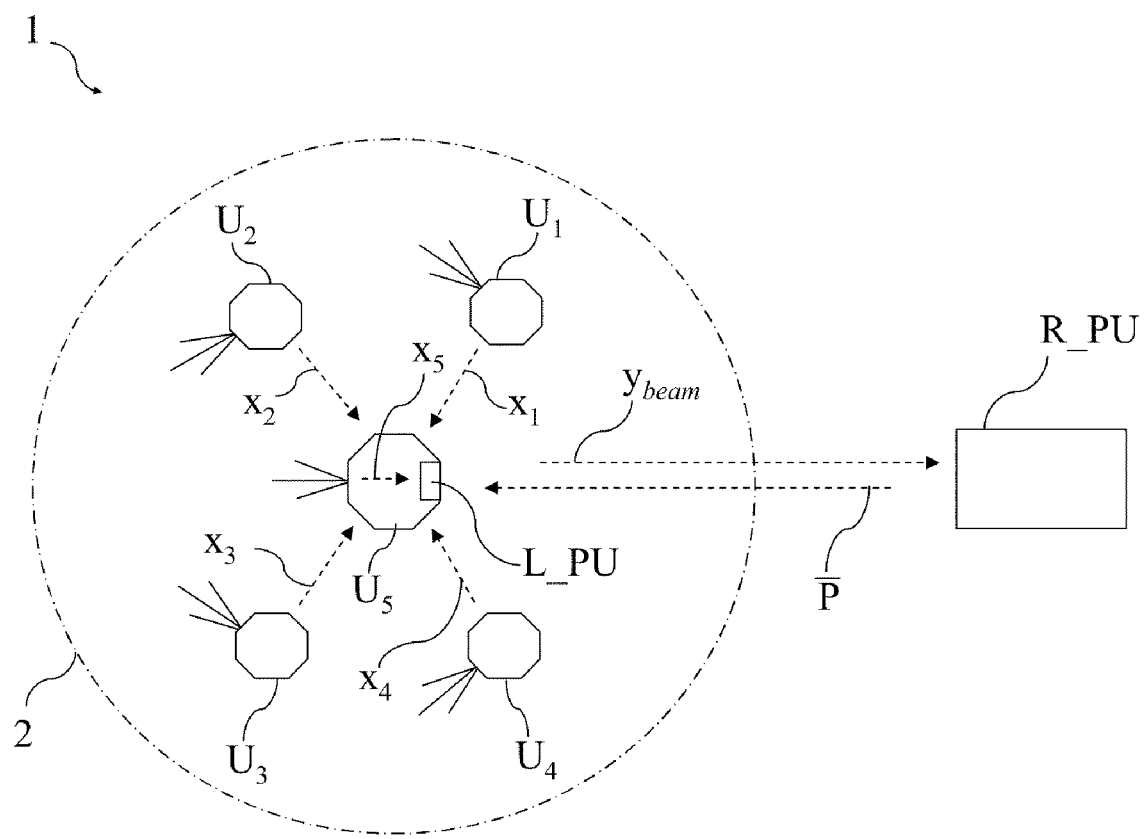
FIG. 1 shows an exemplary block diagram of a data-acquisition system according to an embodiment of the present disclosure, comprising a sensors network, a local processing unit and a remote processing unit.

In FIG. 1 is schematically shown an example of a data acquisition system, generally indicated at 1, comprising a sensor network 2, a local processing unit L_PU and a remote processing unit R_PU.

Sensor network 2 comprises a plurality of sensors $U_1, \ldots, U_5$, for instance micro-sensors (MEMS), that together forms a set of homogeneous sensors $U_1, \ldots, U_5$. In this description, the term "homogeneous group" of sensors $U_1, \ldots, U_5$ means a group of sensors adapted to measure the same physical quantity to provide in output a respective acquired signal $x_1, \ldots, x_5$ representing such physical quantity. For instance sensors $U_1, \ldots, U_5$ might all be sensors adapted to measure a respective value of room temperature. In another example, sensors $U_1, \ldots, U_5$ might all be sensors adapted to measure a respective value of a same chemical quantity.

Although in FIG. 1 a sensor network 2 has been schematically shown comprising five sensors $U_1, \ldots, U_5$, the network 2 may include any integer number of sensors at least equal to two.

Each sensor $U_1, \ldots, U_5$ comprises one or more transducers for acquiring signals $x_1, \ldots, x_5$, representative of the measured physical quantity, and comprises further resources for generating and transmitting such signal $x_1, \ldots, x_5$ processing and output transmission. More specifically, each sensor $U_1, \ldots, U_5$ comprises analog/digital conversion means, to provide in output said signals $x_1, \ldots, x_5$ as digital signals, that is comprising data in a digital format and having a resolution of $N_{res}$ bits. Hereinafter, it is assumed, without necessarily introducing any limitation, to the case wherein signals $x_1, \ldots, x_5$ output from sensors $U_1, \ldots, U_5$ are digital signals, having for instance data represented on $N_{res}$=16 bits.

In one alternative embodiment signals $x_1, \ldots, x_5$ output from sensors network 2 are analog signals destined to be converted in digital signals by suitable analog/digital conversion means provided in the local processing unit L_PU.

Sensors network 2 comprises a local processing unit L_PU which preferably, as in the example illustrated in FIG. 1, is integrated in one of said network 2 sensors, in the shown example in sensor $U_5$. In an alternative embodiment, but operatively equivalent, local processing unit L_PU could be separate from each of the sensors $U_1, \ldots, U_5$ of the sensors network 2.

Local processing unit L_PU is such to receive different digital signals $x_1, \ldots, x_5$ acquired and provided in output from network 2 sensors $U_1, \ldots, U_5$.

Local processing unit L_PU comprises processing means for processing digital signals $x_1, \ldots, x_5$ provided from sensors $U_1, \ldots, U_5$ and to form, starting from such signals, an aggregate digital signal $y_{beam}$ to be transmitted to the remote processing unit R_PU. Local processing unit L_PU comprises processing means in the form of a low-dissipation micro-controller.

In an embodiment, sensor network 2, and more generally data-acquisition system 1, is of a wireless type. In this case, in practice, data transmission among different entities constituting network 2, or more generally data-acquisition system 1, takes place by free space propagation of radio frequency signals. In alternative embodiments, such transmission might take place via wired connections between at least some of different network/system entities. For instance, there may be proposed wired connections between sensors $U_1, \ldots, U_4$ and sensor $U_5$, or more generally between each sensor network 2 sensors $U_1, \ldots, U_5$ and a the local processing unit L_PU.

For the digital signals $x_1, \ldots, x_5$ transmission to local processing unit L_PU, it is possible to envisage various types of access modes. For instance, it is possible for such transmission to envisage for each signal $x_1, \ldots, x_5$ a dedicated frequency channel (FDMA) or as, an alternative, envisage a time-sharing multiple access (TDMA) of different signals $x_1, \ldots, x_5$ to a single channel (TDMA), or even envisage a mixed system FDMA/TDMA.

Figure 2:
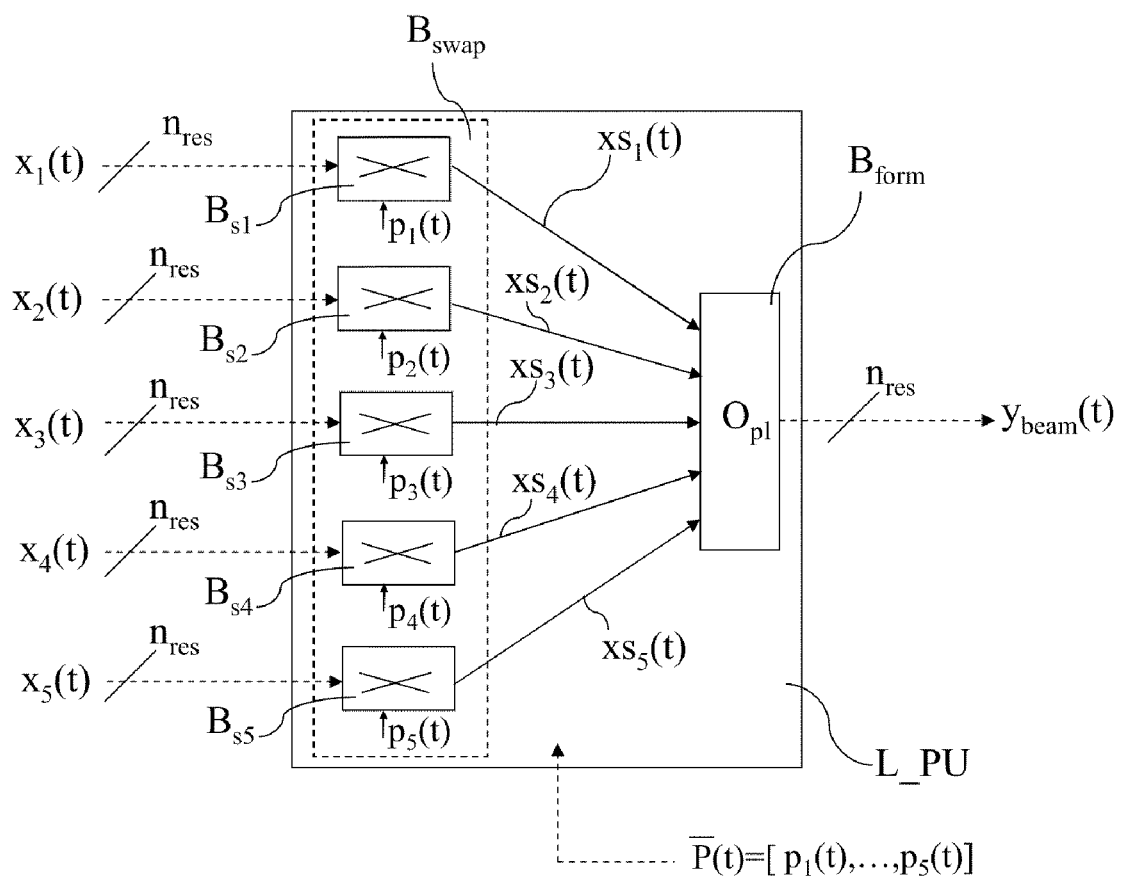
FIG. 2 shows an exemplary block diagram of the local processing unit of FIG. 1.

In FIG. 2 is shown a block diagram of an embodiment of local processing unit L_PU, in this example integrated in one of the homogeneous sensors $U_1, \ldots, U_5$ set. Local processing unit L_PU is such to receive input digital signals $x_1, \ldots, x_5$ provided from the sensors and comprises processing means $B_{swap}$, $B_{form}$ for forming an aggregate signal $Y_{beam}$.

Processing means $B_{swap}$, $B_{form}$ comprise a swap block $B_{swap}$ adapted to modify signals $x_1, \ldots, x_5$ received in input exchanging the data format of each of said signals from a first format to a second format. In FIG. 2 by $x_1(t), \ldots, x_5(t)$ are indicated at clock cycle t digital data in the first format of signals $x_1, \ldots, x_5$ and by $xs_1(t), \ldots, xs_5(t)$ are indicated at clock cycle t digital data in the second format of signals $xs_1, \ldots, xs_5$.

Each data $xs_1(t), \ldots, xs_5(t)$ in the second format is obtained from a respective data in the first format $x_1(t), \ldots, x_5(t)$ by a permutation operation such as to change the bit positions within each data based upon a permutation scheme $p_1(t), \ldots, p_5(t)$ associated with data $x_1(t), \ldots, x_5(t)$ and with the specific digital signal $x_1, \ldots, x_5$ comprising such data $x_1(t), \ldots, x_5(t)$.

As may be noted by a coordinated observation of FIGS. 1 and 2, in an embodiment, the permutation schemes $p_1(t), \ldots, p_5(t)$ may be selected by the remote processing unit R_PU and transmitted to the local processing unit L_PU through at least one signal $\overline{P}$.

For example, the swap block $B_{swap}$ has been shown as formed by a plurality of swap modules $B_{s1}, B_{s2}, B_{s3}, B_{s4}, B_{s5}$, each assigned to process a respective input signal $x_1, \ldots, x_5$. In an alternative embodiment, swap block $B_{swap}$ may be implemented through a single processing unit shared among all signals $x_1, \ldots, x_5$.

Figure 3:
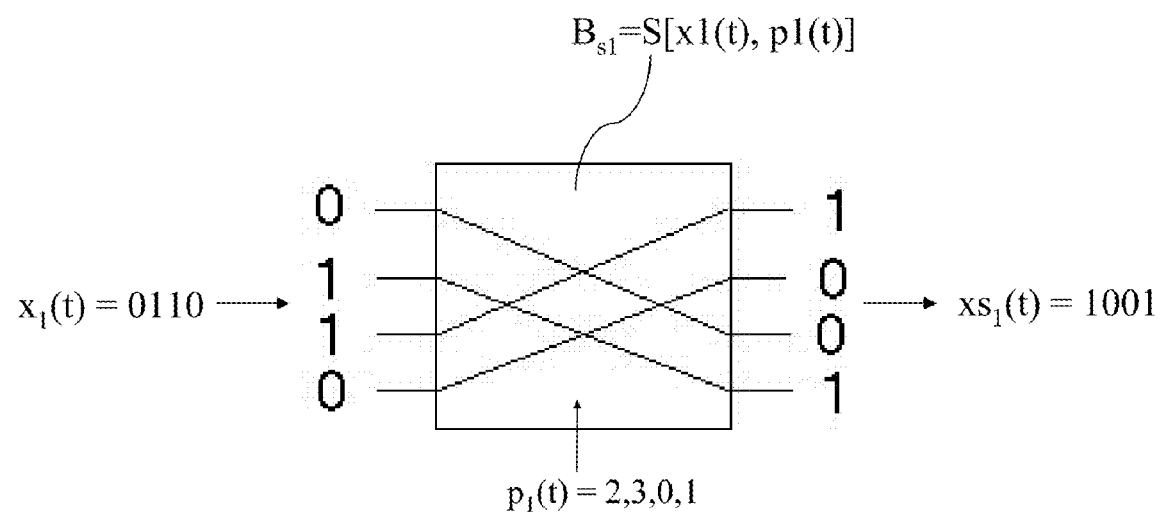
FIG. 3 shows an exemplary logic scheme of a swap module of the local processing unit of FIG. 2.

In FIG. 3 is shown an example of the logic scheme of a swap module, and particularly of swap module $B_{s1}$ provided for processing signal $x_1$. For illustration simplification only, the input data $x_1(t)$ (or first format data) at clock cycle t is represented as data having a resolution equal to $N_{res}$=4 bits. Owing to the fact that swap module $B_{s1}$ is such as to perform only a position swap, or permutation, of the input data bits (first format data) also output data $xs_1(t)$ (second format data) from swap module $B_{s1}$ will be represented in this example as a data having a resolution equal to $N_{res}$=4 bits.

In general, if digital signals $x_1$-$x_n$ data input to the swap module are each represented by $N_{res}$=$2^n$ bits, the permutation scheme (indicated as $p_1$ in FIG. 3) may be in turn expressed as a data, or a coded word, that may take up to $N_{res}!$ values, each may be represented with $N_{res}$ digits, or each may be represented with n bits.

In the example shown in FIG. 3, at the clock cycle t input data is $x_1(t)$=0110 while output data is $xs_1(t)$=1001. In such instance the permutation scheme (referred to the input and output positions numbered as 0, 1, 2, 3) has the expression 2-3-0-1.

In practice, if the permutation scheme is expressed as 2-3-0-1, this is equal to say that swap module $B_{s1}$ performs a bit permutation such that:

the bit having position 0 in the input data has position 2 bit in the output data;
the bit having position 1 in the input data has position 3 bit in the output data;
the bit having position 2 in the input data has position 0 bit in the output data; and
the bit having position 3 in the input data has position 1 bit in the output data;

In more general terms, a swap module $B_{s1}$ equals functionally a combinatory logic operator S (or swap operator) for which is valid a relation of type:

$$B_{s1}(t)=S[x_1(t),p_1(t)]=X_{S1}(t). \qquad (1)$$

A property of such swap operator S is that the operator is reversible, therefore the reverse operator $S^{-1}$ exists such that $x_1(t)=S^{-1}[xs_1(t), p_1(t)]$. Further, direct and reverse swap operations may be carried out using the same S operator, applying two distinct permutation schemes (direct $p_1(t)$ and reverse $p^{-1}(t)$) linked to each other by the bi-univocal relationship:

$$x_1(t)=S^{-1}[xs_1(t),p_1(t)]=S[xs_1(t),p^{-1}(t)]. \quad (2)$$

A few examples of permutation scheme $p^1$ and related reverse schemes $p^{-1}$ are shown in the following table:

| $p^1$ | $p^{-1}$ |
|---|---|
| 1, 2, 3, 0 | 3, 0, 1, 2 |
| 1, 0, 2, 3 | 1, 0, 2, 3 |
| 2, 1, 3, 0 | 3, 1, 0, 2 |
| 1, 3, 0, 2 | 2, 0, 3, 1 |

In general, using a swap operator S for digital data transformation from a first to a second format is known. For instance, applying swap operators to digital data, in the specific field of data transmissions, and more particularly with the aim of reducing a bus switching activity, is described in the US patent application 2004/0201505 A1, which is incorporated by reference.

Another property of a swap operator S resides in the fact that given a positional bitwise logic operator $O_{pl}[d1(t),d2(t)]$, wherein d1(t) and d2(t) are data each represented on $N_{res}$ bits, the following property is valid:

$$S[O_{pl}[d1(t),d2(t)],p(t)]]==O_{pl}[S[d1(t),p(t)],S[d2(t),p(t)]], \quad (3)$$

wherein p(t) represents any swap sequence.

For instance, in case the positional bitwise logic operator $O_{pl}$ is the EX-OR operator, represented by $\oplus$, the above property translates itself in:

$$S[d1(t)\oplus d2(t)], p(t)]]==S[d1(t),p(t)]\oplus S[d2(t),p(t)]. \quad (4)$$

wherein p(t) represents any swap sequence.

Other examples of positional bitwise logic operators are the following: AND, NAND, OR, NOR, EX-NOR, etc. . . . or any combination of said operators.

In case, as often occurs, input signal data $x_1, \ldots, x_5$ to be modified from the swap block $B_{swap}$, and, more particularly, swap units $B_{s1}, B_{s2}, B_{s3}, B_{s4}, B_{s5}$, are represented by a considerable number of bits (for instance 16), one may realize the swap operation such that it operates rigidly on M blocks of input data bits, wherein M is a greater than 1 integer, overall such as envisaged from the teachings of the above mentioned US patent application 2004/0201505 A1. This allows, as will be explained better in the following, a reduction in the permutation schemes' $p_1(t), \ldots, p_5(t)$ length, and in the number of trials to be performed at the remote processing unit R_PU in the permutation schemes $p_1(t), \ldots, p_5(t)$ research operations. This is due to the fact that, as described in the above-mentioned US patent application, in the case wherein the permutation schemes operate on single bits of the data to be processed having a resolution of $N_{res}$ bits, any permutation schemes may be selected within a set of $N_{res}!$ (factorial) possible permutation schemes, while in the case wherein one operates upon M groups of bits this may be selected among M! (factorial) possible permutation schemes. This allows one to reduce considerably computational complexity at the remote processing unit R_PU of the permutation schemes to be utilized by the local processing unit.

In an embodiment, if each of the input signals to the swap block $B_{swap}$ shows stationarity characteristics (for example strict stationarity), it is possible to envisage for each $x_1, \ldots, x_5$ input signal a dedicated permutation scheme group (or set) comprising a finite number W of permutation schemes to be utilized cyclically (i.e., repeatedly), for instance sequentially, for modifying the data format of said input signal. Further, in case $x_1, \ldots, x_5$ input signals present modest stationarity characteristics, it is possible to envisage for each said $x_1, \ldots, x_5$ signals an update of said sets of permutation schemes by the remote processing unit R_PU with an update frequency, for example, much lower compared to the clock frequency of signals $x_1, \ldots, x_5$ received in input to the swap block $B_{swap}$.

Referring to FIG. 2, processing means $B_{swap}$ and $B_{form}$ of local processing unit L_PU further comprise an aggregation (beamforming) block $B_{form}$ for producing starting from signals $xs_1(t), \ldots, xs_5(t)$ as processed by swap block $B_{swap}$ an aggregate signal $y_{beam}(t)$ having $N_{res}$ bits resolution data.

Aggregation block $B_{form}$ produces such aggregate signal $y_{beam}$ by applying a positional logic operator bitwise $O_{pl}$ upon corresponding bits of signals $xs_1(t), \ldots, xs_5(t)$ for producing a single bit of the aggregate signal $y_{beam}$. In other words, for each, $N_{res}$ bits, data $xs_1(t), \ldots, xs_5(t)$ of input signals $xs_1, \ldots, xs_5$, beamforming block $B_{form}$ provides in output an aggregate signal $y_{beam}$ data $y_{beam}(t)$ having a $N_{res}$ bits resolution and such that:

$$y_{beam}(t)=O_{pl}[xs_1(t), \ldots, xs_5(t)]. \quad (5).$$

In an embodiment, the positional logic operator $O_{pl}$ is the Boolean operator EX-OR (also called exclusive OR, also represented by symbol $\oplus$).

Only to make an example in this case, named $xs_1(t)(i)$, $xs_2(t)(i)$, $xs_3(t)(i)$, $xs_4(t)(i)$ $xs_5(t)(i)$ the i-th bits (with i comprised between 0 and $N_{res}-1$) of signals $xs_1, \ldots, xs_5$ at clock cycle t, aggregation block $B_{form}$ produces the i-th bit of aggregate signal $y_{beam}(t)$ at clock cycle t by computing:

$$y_{beam}(t)(i) = xs_1(t)(i) \oplus xs_2(t)(i) \oplus xs_3(t)(i) \oplus xs_4(t)(i) \oplus xs_5(t)(i) \quad (6)$$

$$= \sum_{\oplus}^{u} xs_u(t)(i)$$

for $u = 1, \ldots, 5$.

Expressing a previous relationship as a function of the signals $x_1(t), \ldots, x_5(t)$ received in input from local processing unit L_PU and clearing index i, the aggregate signal $y_{beam}(t)$ data at clock cycle t may be written in the form:

$$y_{beam}(t) = \sum_{\oplus}^{u} S[x_u(t), p_u(t)] \quad (7)$$

wherein $p_u(t)$ is the permutation scheme assigned at clock cycle t to digital signal $x_u(t)$ to modify said data format through swap block $B_{swap}$. As previously explained, permutation schemes $p_u(t)$ that represent in practice digital signatures for the same signal $x_u$ may be repeated cyclically as clock t cycles vary. In that way, permutation sequences $p_u(t)$ may be used to apply to the same signal from a set (associated with said signal) comprising a finite number W of possible sequences identified by the remote processing unit R_PU to modify, in practice to "sign", said signal. More generally, using a bitwise positional logic operator $O_{pl}$ in the aggregation block $B_{form}$ one has:

$$y_{beam}(t) = \sum_{Opt}^{u} S[x_u(t), p_u(t)]. \qquad (8)$$

Referring to FIG. 1, in an embodiment, local processing unit L_PU is such as to send aggregate signal $y_{beam}$ thus obtained to remote processing unit R_PU using a digital modulation, such as for instance a QPSK modulation or a B-PSK modulation compliant with the IEEE 802.14.5 standard.

Remote processing unit R_PU is such as to receive said aggregate signal $y_{beam}$ to decode it with the aim of extracting (that is detect) from it single signals $x_1, \ldots, x_5$ supplied in output by sensors $U_1, \ldots, U_5$ of sensors network 2, or more correctly, of extracting from $y_{beam}$ an as-accurate-as-possible estimate of such $x_1, \ldots, x_5$ signals. For purposes of the present description, an "estimate as accurate as possible" is meant an estimate having an accuracy level compatible with some predefined system requirements.

Figure 4:
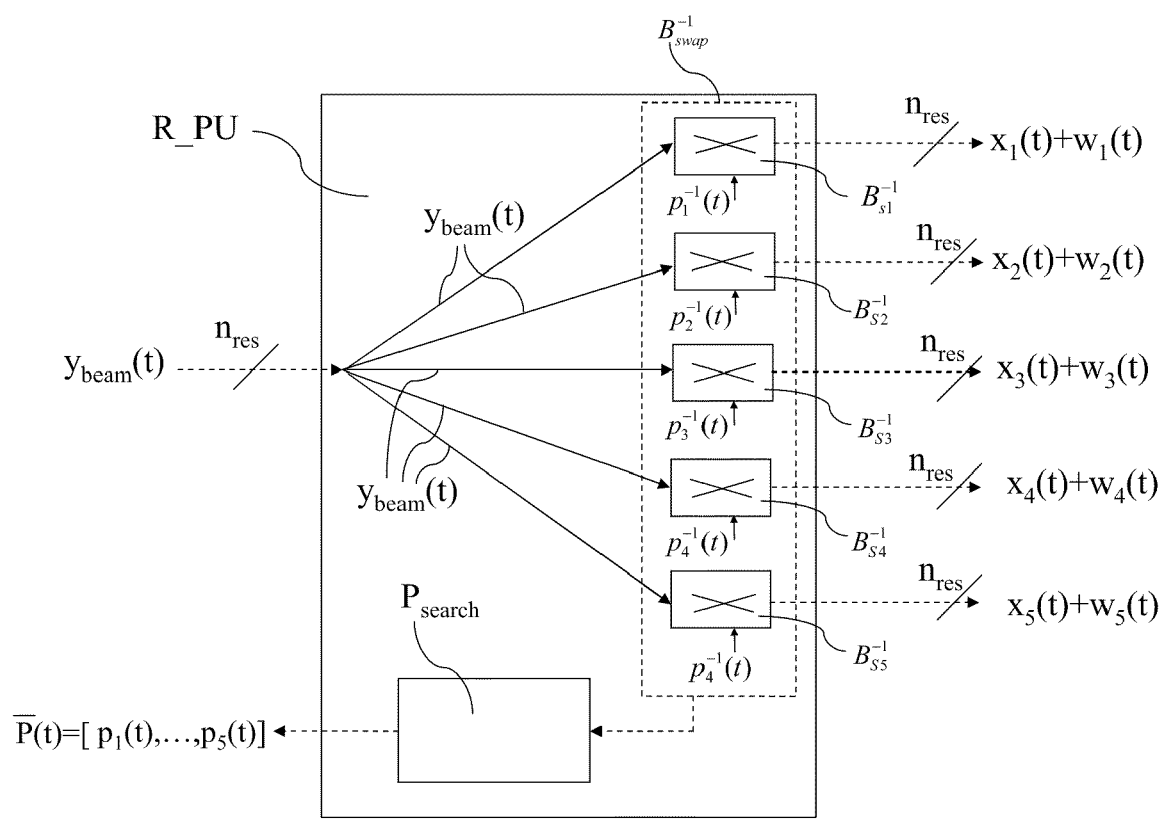
FIG. 4 shows an exemplary block diagram of the remote processing unit of FIG. 1.

In FIG. 4 is shown an exemplary block diagram of an embodiment of a remote processing unit R_PU.

Such remote processing unit R_PU comprises a reverse swap block $B_{swap}^{-1}$ similar to the above described swap block referring to the local processing unit L_PU and to FIG. 2.

In FIG. 4 only by way of example reverse swap block $B_{swap}^{-1}$ has been represented as comprising a plurality of reverse swap blocks $B_{s1}^{-1}, \ldots, B_{s5}^{-1}$ each provided for processing the aggregate signal $y_{beam}$ for reconstructing a respective signal $x_1, \ldots, x_5$ provided in output from sensors $U_1, \ldots, U_5$ and transmitted to local processing unit L_PU.

In practice, reverse swap block $B_{swap}^{-1}$ operates in such a way to process the aggregate signal $y_{beam}$ by applying to said signal data-swap operators that use reverse permutation schemes $p_1^{-1}, \ldots, p_5^{-1}$ with respect to permutation schemes $p_1, \ldots, p_5$ used by swap block $B_{swap}$ in local processing unit L_PU.

As an example, to extract the u-th signal from the aggregate-signal-reverse swap block $B_{swap}^{-1}$ is to execute the following swap operation:

$$S[y_{beam}(t), p_u^{-1}(t)] = S\left[\sum_{\oplus}^{u} S[x_u(t), p_u(t)], p_u^{-1}(t)\right] \qquad (9)$$
$$= x_u(t) \oplus \sum_{\oplus}^{m \neq u} S[S[x_m(t), p_m(t)], p_u^{-1}(t)]$$
$$= x_u(t) \oplus w_u(t).$$

From the above cited relationship, which refers to the specific case wherein the positional logic operator used to form signal $y_{beam}$ is the Boolean operator EX-OR, it is evident that the extracted signal has been corrupted by a noise process due to all remaining signals that have contributed to form aggregate signal $y_{beam}$ at local processing unit L_PU. It is observed that the above-cited relationship as an example for the specific case of EX-OR operator may also be true for other bitwise positional logic operators.

For this reason, the remote processing unit R_PU comprises a search block $P_{search}$ provided for searching permutation schemes, or better sets (or sequences) comprising a limited and restricted number W of permutation schemes, to be transmitted to the local processing unit L_PU with the aim of reducing as far as possible, from each u-th signal to be extracted (i.e., to be revealed) from aggregate signal $y_{beam}$, the interference due to the process $w_u(t)$.

This in practice reduces itself to the search of permutation scheme sets such as to satisfy the following relationship:

$$w_u(t) = \left\|\sum_{\oplus}^{m \neq u} S[S[x_m(t), p_m(t)], p_u^{-1}(t)]\right\| \leq \varepsilon \qquad (10)$$

wherein $\varepsilon$ is an arbitrary small predefined value. The above criteria correspond to minimize noise energy $E_u$ due to $w_u(t)$ process. Such energy $E_u$ is given by:

$$E_u = \sum_{i=0}^{N_{res}-1} |w_u(t)(i)|^2 \cdot 2^{2i}, \qquad (11)$$

wherein $w_u(t)(0)$ is the signal $w_u(t)$ least-significant bit while $w_u(t)(N_{res}-1)$ is the signal $w_u(t)$ most-significant bit.

The search of the U permutation sequences sets (each sequence comprising W permutation schemes) according to the above-noted criteria has a computational complexity such as $(N_{res}!)^{U \cdot W}$, wherein U is the number of signals (in this example, U=5) that contribute to the $y_{beam}$ aggregate-signal formation. This applies in the case wherein the permutation schemes operate independently on each bit of the data signals provided in output from the sensors.

In the case in which instead the permutation schemes are such as to operate upon M bit sets of the data signals provided in output from the sensors, the U permutation sequences sets search according to above-noted criteria has a computational complexity that reduces itself to $(M!)^{U \cdot W}$.

In a first embodiment, the permutation schemes sequences search problem may be solved in a heuristic way, through the study of the characteristics of the signals provided in output from sensors $U_1, \ldots, U_5$ such as to minimize the noise spectral density of $w_u(n)$. A shortcoming of this methodology is given from the high computational complexity and from the requested times to execute such heuristic search.

In an alternative embodiment, search block $P_{search}$ executes the permutation-sequence-schemes search operation in a sub-optimal way minimizing (or maximizing) a predefined cost function, that represents the search operation metric and that is given by the sum (or by the product, using logarithms) of an individual contribution plurality. In that case, in an embodiment, search block $P_{search}$ operates according to a Viterbi algorithm.

As it is known, such algorithm application, that represents a "brick" of telecommunications theory, is not limited to signals decoding and equalization, because such algorithm more generally represents a strategy to minimize (or maximize) a cost function based upon a system description in terms of inputs, states and outputs. Such system description is known in the field by the name of "trellis diagram".

In an embodiment, search block $P_{search}$ realizes a Viterbi algorithm according to the following operations:

a) casually generate a permutation schemes sequence (in practice, comprising W schemes) to be associated with first $x_1$ of U signals provided in output from sensors, and For remaining U−1 signals $x_2, \ldots, x_5$:

b) identify, operating signal by signal and through trials, respective permutation schemes sequences, such as to minimize for each (remaining) signal $x_u$ a given cost function (or metric) of energy $E_u$ (substantially as defined in formula 10)

of interference (substantially as defined in formula 9) of the other signals whose permutation schemes have already been identified through Viterbi algorithm.

In this way "almost-orthogonal" permutation sequences schemes are obtained, that is permutation sequences schemes such to render, for each signal extracted from aggregate signal $y_{beam}$, the interference contribution at formula 10 as small as possible.

An embodiment of a Viterbi algorithm carried out by search block $P_{search}$ uses a fully coupled trellis diagram. This means that in the Viterbi algorithm, once a selected permutation scheme (start state) starts at cycle t−1, it is possible to carry out a transition (that is carry out a trial) at cycle t towards any permutation scheme (arrival state) including the start one. This selection, compared to the use of a partially coupled trellis, does not limit the system's degrees of freedom during the permutation schemes sets search. On the contrary, adopting a partially coupled trellis scheme may be a strategy to be used to reduce the number of trials to be carried out during the permutation schemes sequence.

A Viterbi algorithm of depth D (D is a parameter whose meaning is known to a person skilled in the art), is significantly less with respect to a number of sequences W that are part of a same set of permutation sequences (e.g.,: W=32 and D=16).

In an embodiment, remote processing unit R_PU, besides the search operations of permutation schemes sequences and of extraction of different signals from the aggregate signal, carries out post-processing operations on extracted signals. In fact, extracted signals from aggregate signal $y_{beam}$ may show replicas in the time domain (due to frequency domain sampling) and high-frequency components that require a baseband conversion and a subsequent low-pass-type filtering. Such filtering may be carried out by a Butterworth filter or an elliptic type filter (not shown in FIG. 4 scheme).

Experimental tests and simulations have demonstrated the effectiveness, in terms of power savings at the remote processing unit, as compared to known art methods.

Figure 5:
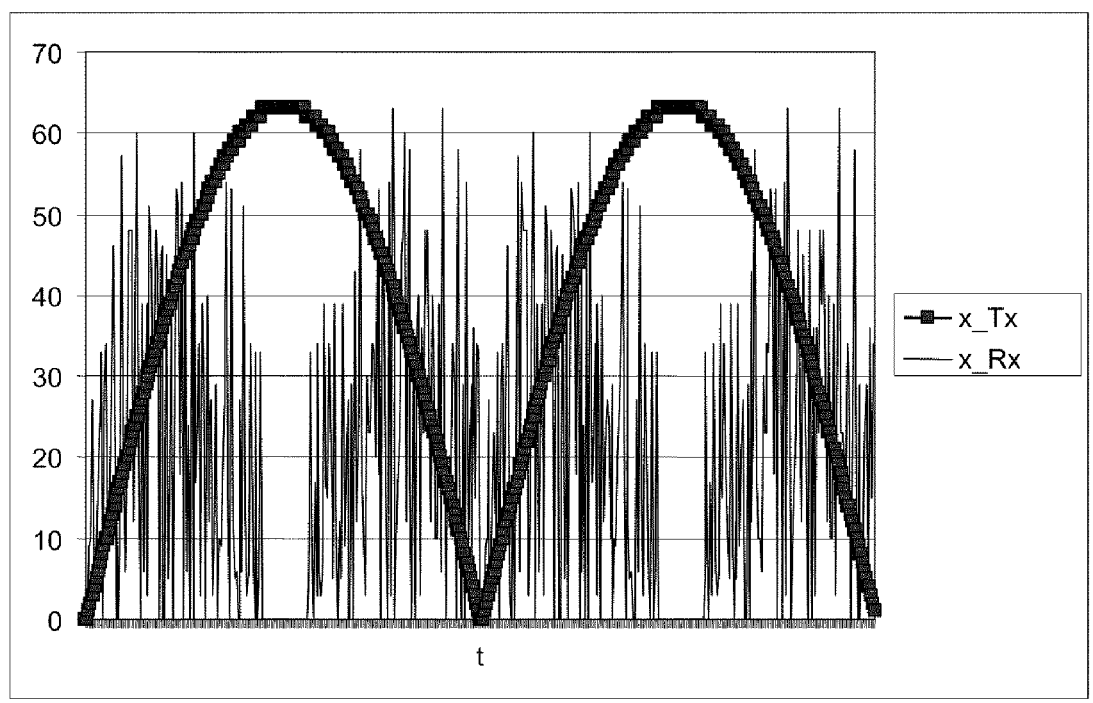
FIG. 5 shows a waveform portion of an exemplary output signal provided by a sensor and a waveform portion of a signal extracted from the aggregate signal.

In FIG. 5 is shown the time pattern of a signal provided in output by one of the sensors (indicated as x-Tx) and of the corresponding signal (indicated as x_Rx) extracted by the remote processing unit R_PU from the aggregate signal. In this case, the transmitted signal is an absolute value sinusoidal waveform, while the number U of signals that have contributed to signal aggregated $y_{beam}$ is equal to 4 (in practice, U=4). As may be noticed in FIG. 5, extracted signal x_Rx shows high frequency components.

Figure 6:
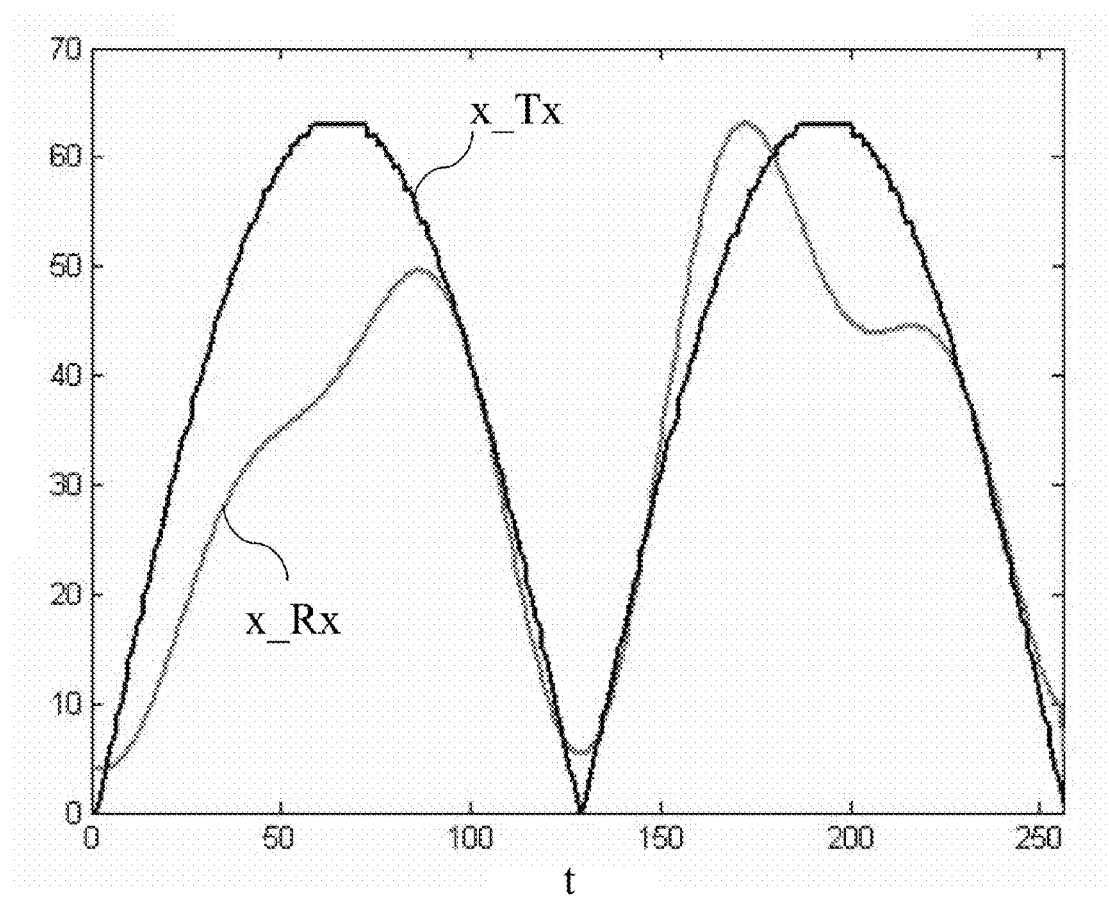
FIGS. 6 and 7 each show a waveform section of an exemplary output signal provided by a sensor and a waveform section of the signal extracted from the aggregate signal following a filtering operation.

In the graph of FIG. 6, signal x_Tx is compared with extracted signal x_Rx following a filtering operation by an 8-pole low-pass Butterworth filter with a normalized frequency of 0.000025 Hz.

Figure 7:
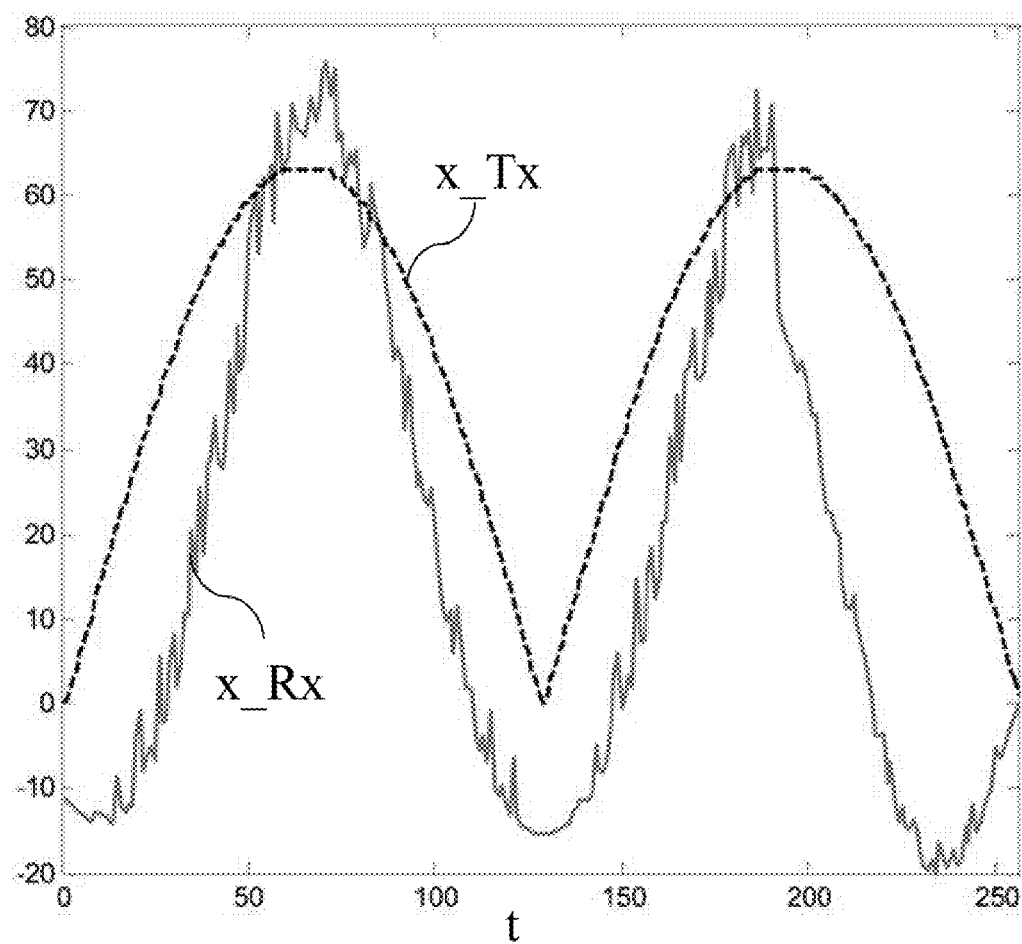

In the graph of FIG. 7, transmitted signal x_Tx is compared with extracted signal x_Rx after a filtering operation by an elliptic two-pole low-pass filter having a normalized frequency equal to 0.025 Hz.

Figure 8:
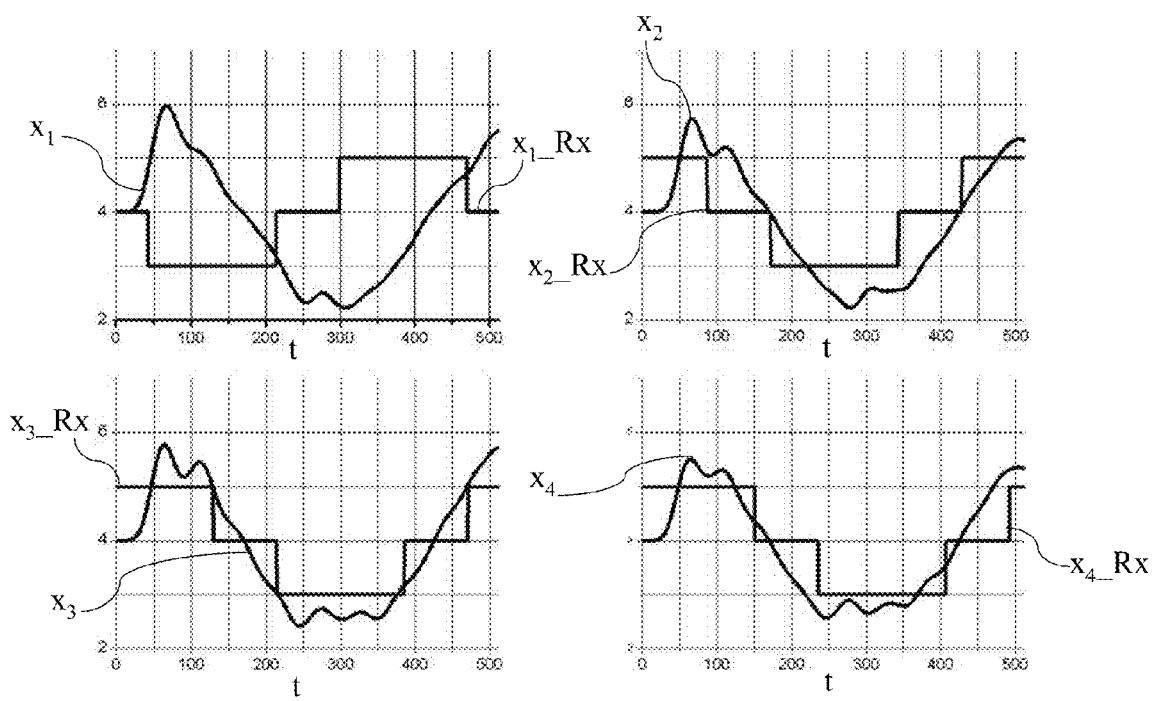
FIG. 8 shows waveforms of exemplary output signals provided by a group of four sensors and corresponding signals extracted from an aggregate signal $y_{beam}$.

Finally, in FIG. 8 four signals are shown $x_1, \ldots, x_4$ provided in output from four sensors $U_1, \ldots, U_4$ (of a four-sensor group) and corresponding signals $x_1\_Rx, \ldots, x_4\_Rx$ extracted from aggregate signal $y_{beam}$, filtered and detected.

The sensor group 2 of FIG. 1 may be disposed on an integrated circuit (IC) that may be part of a first system and coupled to another IC such as a processor/controller. The remote processor R_PU may by formed on the same or a different IC, and this IC may be part of the first or part of a second system, and coupled to another IC such as a processor/controller.

From the foregoing it will be appreciated that, although specific embodiments of the disclosure have been described herein for purposes of illustration, various modifications may be made without deviating from the spirit and scope of the disclosure.

What is claimed is:

1. A decoder, comprising:
   a node operable to receive an aggregate digital word that includes symbols in respective symbol positions within the aggregate word; and
   a recovery circuit coupled to the node and operable to
      generate from the aggregate word a first decoded word by changing the positions of two of the symbols according to a first pattern, and
      generate from the aggregate word a second decoded word by changing the positions of two of the symbols according to a second pattern.

2. The decoder of claim 1 wherein the recovery circuit is further operable to:
   generate a first filtered word by filtering the first decoded word according to a first filtering algorithm; and
   generate a second filtered word by filtering the second decoded word according to a second filtering algorithm.

3. The decoder of claim 1 wherein:
   the node is operable to receive the aggregate word from an encoder remote from the node and processor, the encoder being operable to generate the aggregate word as a result of a symbol-wise operation on first and second encoded words, the encoder operable to form the first encoded word by changing positions of symbols within a first word according to a third pattern, the encoder operable to form the second encoded word by changing positions of symbols within a second word according to a fourth pattern; and
   the recovery circuit is operable to
      determine a level of interference in one of the first and second decoded words caused by the other of the first and second encoded words,
      update one of the third and fourth patterns to reduce the level of interference, and
      send the updated one of the third and fourth patterns to the encoder.

4. The decoder of claim 3 wherein:
   the third pattern is an inverse of the first pattern; and
   the fourth pattern is an inverse of the second pattern.

5. The decoder of claim 1 wherein the recovery circuit comprises a processor.

6. A system, comprising:
   a node operable to receive an aggregate digital word that includes symbols in respective symbol positions within the aggregate word;
   a recovery circuit coupled to the node and operable to
      generate from the aggregate word a first decoded word by changing the positions of two of the symbols according to a first pattern, and
      generate from the aggregate word a second decoded word by changing the positions of two of the symbols according to a second pattern; and
   a controller coupled to the recovery circuit.

7. The system of claim 6 wherein the node, recovery circuit, and the controller are disposed on a same integrated circuit.

8. The system of claim 6 wherein the node, the recovery circuit, and the controller are disposed on at least two integrated circuits.

9. A method, comprising:

receiving an aggregate digital word that includes symbols in respective symbol positions within the aggregate word;

generating from the aggregate word a first decoded word by changing the positions of two of the symbols according to a first pattern; and generating from the aggregate word a second decoded word by changing the positions of two of the symbols according to a second pattern.

10. The method of claim 9, further comprising:

wherein receiving the aggregate word comprises receiving the aggregate word from an encoder that generates the aggregate word as a result of a symbol-wise operation on first and second encoded words, the encoder forming the first encoded word by changing positions of symbols within a first word according to a third pattern, the encoder forming the second encoded word by changing positions of symbols within a second word according to a fourth pattern; and determining a level of interference in one of the first and second decoded words caused by the other of the first and second encoded words;

updating one of the third and fourth patterns to reduce the level of interference; and sending the updated one of the third and fourth patterns to the encoder.

* * * * *